US010680841B1

(12) United States Patent
Kalluri et al.

(10) Patent No.: US 10,680,841 B1
(45) Date of Patent: Jun. 9, 2020

(54) FACILITATED CONTENT SELECTION USING OCCURRENCES OF DOWNSTREAM EVENTS RESPONSIVE TO PRIOR CONTENT DISTRIBUTIONS

(71) Applicant: Oracle International Corporation, Redwood Shores, CA (US)

(72) Inventors: Sudhakar Kalluri, Cupertino, CA (US); Venkata Duvvuri, Los Gatos, CA (US); Swetha Krishnakumar, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/286,297

(22) Filed: Feb. 26, 2019

(51) Int. Cl.
*H04L 12/24* (2006.01)
*H04L 12/18* (2006.01)
*G06N 20/00* (2019.01)
*G06Q 10/10* (2012.01)

(52) U.S. Cl.
CPC ........... *H04L 12/185* (2013.01); *G06N 20/00* (2019.01); *G06Q 10/10* (2013.01)

(58) Field of Classification Search
CPC ....... H04L 12/185; G06N 20/00; G06Q 10/10
See application file for complete search history.

(56) References Cited

U.S. PATENT DOCUMENTS 9,552,334 B1 * 1/2017 Meisels ................. G06Q 50/01
10,534,832 B1 * 1/2020 Miller ................. H04L 67/2842
2019/0349263 A1 * 11/2019 Ghosh ..................... H04L 41/16

* cited by examiner

*Primary Examiner* — Kim T Nguyen
(74) *Attorney, Agent, or Firm* — Kilpatrick Townsend & Stockton LLP

(57) ABSTRACT

The present disclosure generally relates to techniques for determining a segment of a content distribution plan. More specifically, the present disclosure discloses techniques for determining one or more key-value pairs of a content distribution plan by leveraging a trained machine learning model. A plurality of electronic communications may be generated based on completed key-value pairs with a content distribution plan. The plurality of electronic communications may then be distributed to a plurality of devices within a networked environment.

20 Claims, 8 Drawing Sheets

Content Distribution Plan Table 402

| Content Distribution Plan ID 404 | Vector Representation 1 406 | Vector Representation 2 408 | Vector Representation 3 410 | Characteristic 1 412 | Characteristic 2 414 |
|---|---|---|---|---|---|
| 15798 | <1, 1, 1> | <2, 2, 2> | <3, 3, 3> | 0.80 | 0.75 |
| 24578 | <2, -3, 5> | <2, 2, 3> | <-2, 3, -5> | 0.50 | 0.30 |
| 98460 | <-5, 1, 8> | <5, -4, 8> | <3, 5, 3> | 0.85 | 0.25 |

FIG. 4

FACILITATED CONTENT SELECTION USING OCCURRENCES OF DOWNSTREAM EVENTS RESPONSIVE TO PRIOR CONTENT DISTRIBUTIONS

TECHNICAL FIELD

The present disclosure generally relates to techniques for facilitating a selection of a segment of a content distribution plan. More specifically, the present disclosure discloses techniques for facilitating a selection of one or more key-value pairs of a content distribution plan by leveraging a trained machine learning model.

BACKGROUND

Electronic communications have increasingly become part of everyday life for many people. Not only do individuals actively initiate sending of a variety of types of electronic communications (e.g., email, text messages, social media messages) repeatedly throughout the day, but many-fold more are transmitted in the background. However, given the vast amount of electronic communications already distributed, it may be difficult to construct an effective electronic communication. For example, an electronic communication may be treated differently depending on the contents of the electronic communication. In such an example, an electronic communication may be ineffective (e.g., unintentionally remain unopened, unread, treated as spam, and/or discarded). Therefore there is a need for methods and systems that may be utilized to construct effective electronic communications.

BRIEF SUMMARY

The present disclosure generally relates to techniques for facilitating a selection of a segment of a content distribution plan. More specifically, the present disclosure discloses techniques for facilitating a selection of one or more key-value pairs of a content distribution plan by leveraging a trained machine learning model. Each content distribution plan can include multiple segments, which can correspond to (for example) an identification of destinations to which content (e.g., an email) is to be delivered, subject-line content, text content, graphic content, and/or a date and/or time at which the content is to be transmitted. Each segment can include a key-value pair, where the key identifies the segment and the value indicates the plan-specific details for that segment (e.g., "Subject: computer-network security alert"). Previously executed content distribution plans (for which content of the plan was transmitted in accordance with the plan) can be associated with data that characterizes downstream electronic events detected in response to transmission of content in accordance with individual plans. For example, the data may indicate a quantity of a fraction of transmissions of the content that resulted in viewing some or all of the text content or activating a link within the content.

The downstream-event data can be used to facilitate selection of content (and/or particular value within a key-value pair) to be integrated with an incomplete content distribution plan. Specifically, the incomplete plan can include one or more completed key-value pairs and at least one incomplete key-value pair (which lacks a value, such as a value corresponding to a subject or text content). At least one of the completed key-value pairs can be used to identify a subset of the previously executed content distribution plans that are within a predefined degree of similarity to the incomplete content distribution plan. Values from the subset that correspond to the key in the incomplete key-value pair can be identified. In some instances, an output can be generated that is configured to support a presentation that visually associates, for each plan within the subset, the data characterizing the downstream electronic events with the identified value. In some instances, the data characterizing the downstream electronic events is used to further filter or sort values from the content distribution plans within the subset. An output that includes the further filtered or sorted values can then be generated. In some embodiments, the output may be referred to as a candidate group.

In some instances, each complete (e.g., previously executed) content distribution plan and/or each incomplete content distribution plan can be represented using vector representations. For example, each key-value pair can be represented using a corresponding vector representation. A machine-learning model can be trained to identify degrees of similarity between (incomplete and/or complete) content distribution plans based on the vector representation.

In some embodiments, a selection of a particular value identified in the output may be detected as having been selected (e.g., via a user interface). The incomplete content distribution plan can then be supplemented and/or modified to include the selected particular value. The supplemented and/or modified content distribution plan can then then be transmitted (for example) to a client device and/or one or more user devices.

The foregoing, together with other features and embodiments will become more apparent upon referring to the following specification, claims, and accompanying drawings.

BRIEF DESCRIPTION OF THE DRAWINGS

FIG. 4 is a simplified electronic communication database table in accordance with one or more embodiments.

DETAILED DESCRIPTION

Figure 1:
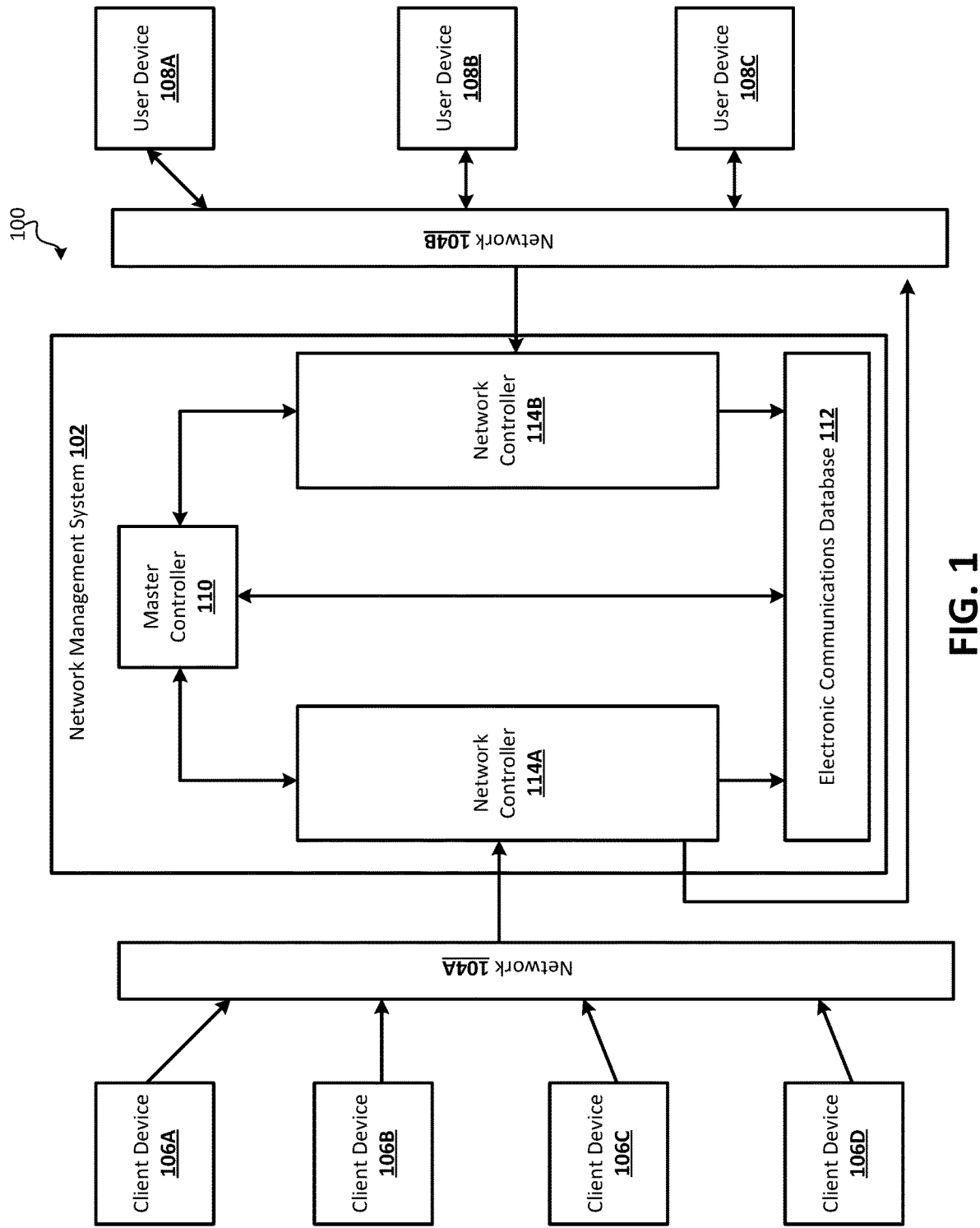
FIG. 1 is a simplified block diagram of a first network environment in accordance with one or more embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

The present disclosure generally relates to techniques for facilitating a selection of a segment of a content distribution plan. More specifically, the present disclosure discloses techniques for facilitating a selection of one or more key-value pairs of a content distribution plan by leveraging a trained machine learning model. A content distribution plan may include a framework for generating a plurality of electronic communications. The content distribution plan may include a paradigm for generating electronic communications. A content distribution plan may comprise a set of key-value pairs that correspond to different aspects of an electronic communication. A key in a key-value pair may correspond to a particular field within or pertaining to an electronic communication and the value in the key-value pair may correspond to content and/or an identifier associated with the particular field. For example, a key-value pair may be an electronic communication's subject line (e.g. key) and the text within the electronic communication's subject line (e.g. value). In some embodiments, a content distribution plan may comprise one or more completed key-value pairs. A completed key-value pair may be a key-value pair that has a completed value. A completed value may be defined by a user associated with the content distribution plan and may include text, a graphic, a device identifier, a time and/or one or more other non-null values.

In some instances, a network management system may receive a content distribution plan from a client device and define electronic communications based on the received content distribution plan. For example, a content distribution plan may indicate what content an electronic communication is to include, to which (e.g., user-device) destination(s) (e.g., device(s) and/or address(es)) the communication is to be transmitted, a subject of the communication, etc. Thus, a single content distribution plan can identify details for a plurality of electronic communications that are to be transmitted when executing a single content distribution plan.

Previously distributed electronic communications may be referred to as past electronic communications. Each past electronic communication may be based on a past content distribution plan. For example, a past content distribution plan may comprise completed key-value pairs that indicate content that is to be included in the communication and transmission details (e.g., identifying a destination and time of transmission).

The network management system may generate, by transformation processes, vector representations of completed key-value pairs of past content distribution plans. A past content distribution plan and its corresponding vector representations may be stored in a data record within the network management system. In some embodiments, the transformation process for generating a vector representation may be determined by the key in the key-value pair. Thus, for example, a transformation that is to be applied to a value corresponding to a subject line of a communication may differ from a transformation that is to be applied to a value representing a graphic to be included in content of the communication. A transformation may include (for example) representing a value (e.g., a text value) in a vector space defined by a vector space model. The vector space can be defined such that words, phrases or sentences that are semantically similar are mapped to similar positions within the space. A transformation can include applying a Word2vec model, Bag-of-Words model and/or Skip-Gram model. A transformation can include generating statistics that relate to (for example) a number of characters, words, sentences or paragraphs in a text value; a frequency of use of particular punctuation types (e.g., question mark, exclamation mark); one or more dimensions of an image; contrast of an image; colors used within an image; a number of segments detected within an image; etc. A model used in the transformation may be trained using (incomplete and/or complete) content distribution plans and/or using other content. An optimization variable used during the training may relate to (for example) maximizing the ability to distinguish between values using vector representations. A vector representation may have associated vector metadata which may indicate the transformation process utilized to create the vector representation.

In some embodiments, for each past content distribution plan, all vector representations of the completed key-value pairs are concatenated to generate an overall vector representation. The concatenated overall vector representation can include (for example) a one-dimensional vector or a multi-dimensional array. The overall vector representation may have associated overall vector metadata which identifies transformation processes that were utilized to generate different aspects of the overall vector representation. The overall vector representation as well as overall vector metadata may be stored in a data record within the network management system.

The past content distribution plans can be used to facilitate selection of content for an incomplete content distribution plan. The incomplete content distribution plan can be sufficiently defined such that one or more completed key-value pairs have been defined or can be derived. However, the incomplete content distribution plan is incomplete in that a value for at least one "incomplete" key-value pair has not been defined or finalized. For each completed key-value pair, a vector representation of the pair can be generated (e.g., using a technique disclosed herein, such as one disclosed in the context of representing a past contribution plan). When the plan includes multiple completed key-value pairs, the corresponding representations can be concatenated to form a partial overall vector representation. When the plan includes only a single completed key-value pair, the partial overall vector representation can be defined as the vector representation of the single pair. The partial overall vector representation may be partial because it does not include a vector representation of the incomplete key-value pair. In some embodiments, the incomplete key-value pair may have no value or may be indicated by a user of the client device as being incomplete.

The partial overall vector representation of the new content distribution plan can be compared to each of multiple overall vector representations of past content distribution plans to identify a subset of the multiple overall vector representations that are similar to the partial overall vector representations. For example, an iterative or parallel processing can be used to compare each of the multiple overall vector representations to the partial overall vector representation to generate a similarity score. The subset can be defined to include overall vector representations (or corresponding content distribution plans) for which the similarity score exceeded an absolute or relative threshold. The similarity score may be based on (for example) a Euclidean distance or Cosine similarity between the partial overall vector representation and the overall vector representation.

Because the partial overall vector representation contains vector representations of completed key-value pairs, the comparison performed via the machine learning model may compare the partial overall vector representation to a corresponding section of an overall vector representation. For example, the new content distribution plan and the past content distribution plans may have 5 unique sections associated with 5 respective unique key-value pairs. A partial overall vector representation associated with the new content distribution plan may contain vector representations associated with 4 out of the 5 sections (e.g., four completed key-value pairs and one incomplete key-value pair). In such an instance, a comparison section of an overall vector representation may be defined as that which is associated with the same 4 sections of the partial overall vector representation.

The subset of the multiple overall vector representations that are similar to the partial overall vector representations may be sorted, ranked or clustered based on (for example) the similarity scores and/or characteristics representative of downstream electronic events associated with the completed content distribution plans in the subset. The characteristic may indicate (for example) whether distributed content (or part of the distributed content) was accessed or opened at a destination device, whether a link (included in the distributed content) was activated, and/or whether a purchase was made during a session on a website initiated by accessing the content, etc. The characteristic may further include a statistic that relates to a number or a fraction of communication transmissions distributed in accordance with the plan that resulted in a particular type of downstream electronic event (e.g., content access, link activation or purchase).

In some instances, a machine-learning model can be used to further process the subset. For example, the machine-learning model may be used to predict a characteristic representing downstream electronic events if an incomplete content distribution plan were to be completed in accordance with a particular value associated with a particular completed content distribution plan represented in the subset. More specifically, the machine-learning model can be configured to receive an input that includes a full representation of a content distribution plan (e.g., an overall vector representation) and to output a predicted characteristic for the plan. This configuration may be used to predict characteristics pertaining to downstream electronic events associated with each of multiple potential segment values for a plan. For example, a new content distribution plan may include one or more completed key-value pairs and at least one incomplete key-value pair. An incomplete key-value pair may be a key-value pair that is missing a value. Multiple vector representations can then be generated, where all of the vector representations include representations of the one or more completed key-value pairs but each of the vector representations further represent a different possible value for the incomplete pair. Each of the different possible values can correspond to a plan represented in the subset. Each vector representation can then be processed by the machine-learning model to predict a characteristic for an associated potential completion of the content distribution plan. Thus, for each similar completed content distribution plan, one or both of a similarity score and a predicted characteristic representative of predicted downstream-electronic-event occurrences can be identified.

An output can be generated based on part or all of the subset and transmitted to a client device. The output may be referred to as a candidate group that triggers a presentation that identifies, for each of at least one past content distribution plan represented in the subset, the value that is associated with the incomplete key-value pair in the incomplete content distribution plan. The value that is associated with the incomplete key-value pair may be referred to as a candidate value. The candidate value may be a potential value that may be utilized to complete the incomplete content distribution plan. The output may further include, for each of the at least one past content distribution plan represented in the subset, the similarity score and/or characteristic associated with the plan. For example, the output may include a similarity score associated with a candidate value. The output may identify an order or visual arrangement in which the candidate values (and potentially the associated similarity scores and/or characteristics) are to be presented in an interface. The order may correspond to a ranking determined based on characteristics or similarity scores associated with each past content distribution plan in the group of similar past content distribution plans. The client device may then generate a presentation (e.g., as a webpage interface) that includes one or more aspects (e.g., characteristics, values, similarity scores, etc.) of the similar past content distribution plans. The interface may be configured to receive input that corresponds to a selection of a candidate value. For example, the input may correspond to a selection of a particular value for the key "subject line" such as "Urgent, Meeting Notes". The input may include a selection of a past content distribution plans, which itself includes or is associated with the value. In some embodiments, a candidate value may automatically selected by an autonomous process in order to select a candidate value that may be subsequently utilized to complete the incomplete content distribution plan.

The interface can be configured such that, upon detecting a selection of a value, the client device can then send a transmission to the network management system that identifies the value selection. In some embodiments, the network management system may complete the incomplete key-value pair of the new content distribution plan based on the received value selection (e.g., one or more previously completed key-value pairs). A same or different transmission from the client device may further correspond to an instruction to generate one or more electronic communications based on the new content distribution plan and potentially to transmit the generated electronic communication(s). In instances in which multiple electronic communications are generated, the electronic communications may (but need not) be transmitted simultaneously or concurrently distributed to a plurality of user devices across a network. Each electronic communication may be transmitted (for example) to a pre-identified user device (e.g., that corresponds to a destination address identified by the client device).

FIG. 1 is a simplified block diagram of network environment 100. Network environment 100 may comprise multiple systems communicatively coupled to each other via networks 104A and 104B. The systems in FIG. 1 include one or more network management systems 102, one or more client devices 106A-106D, and one or more user devices 108A-108C. Network management system 102, client devices 106A-106D, user devices 108A-108C may be communicatively coupled to each other via networks 104A and 104B.

Network management system 102 may be a computerized system for managing electronic communications within network environment 100. In some embodiments, network management system 102 may distribute content (e.g., electronic communications) within network environment 100 based on content distribution plans. For example, a content distribution plan may be received by network management system 102 via network 104A. In such an example, electronic communications may generated based on the received content distribution plan and subsequently distributed by network management system 102, via network 104B, to one or more user devices 108A-108C. Network management system 102 may provide to client devices 106A-106D a content distribution plan framework, which may be a paradigm for content distribution plans. The content distribution plan framework may comprise a set number of key-value pairs that may be utilized to construct a content distribution plan. For example, keys (of key-value pairs) may include "subject line", "body", "signature", "to", "from", "date to be sent", "time to be sent", "targeted recipient group", and the like. Network management system 102 may include one or more master controllers 110, one or more electronic communications databases 112 and one or more network controllers 114A-114B. Master controller 110 may control one or more operations of network management system 102. Master controller 110 may be coupled to network controllers 114A-114B and electronic communications database 112. In some embodiments, master controller 110 may control one or more operations of network controllers 114A-114B and/or electronic communications database 112.

Network management system 102 may comprise one or more processors and non-volatile memory resources (e.g., electronic communications database 112). The processor(s) (e.g., master controller 110, network controllers 114A and 114) may include single or multicore processors. The processor(s) may include general purpose microprocessors such as ones provided by Intel®, AMD®, ARM®, Freescale Semiconductor, Inc., and the like, that operate under the control of software stored in associated memory. An application executed by network management system 102 may be executed by the processor(s).

Networks 104A and 104B may facilitate communications between the various systems depicted in FIG. 1. Networks 104A and 104B can be of various types and can include (for example) the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, Bluetooth®, and other protocols. In general, networks 104A and 104B may include any infrastructure that facilitates communications between the various systems depicted in FIG. 1. In some embodiments, networks 104A and 104B may be implemented a single communication network. In some embodiments, network 104A may be a restricted network such that only authorized client devices may communicate to network management system 102 using network 104A. For example, network 104A may be an enterprise network or a private virtual network. In such an example, network 104B may be a public communication network.

Electronic communications database 112 may store a plurality of past content distribution plans and associated past content distribution plan data. In some embodiments, the past content distribution plans stored in electronic communications database 112 may be past content distribution plans previously received by network management system 102. In some embodiments, the electronic communications generated from a past content distribution plan may be stored as past content distribution plan data within electronic communications database 112. In some embodiments, the past electronic communications stored in electronic communications database 112 may be electronic communications distributed by a third-party distribution service. Past content distribution plan data associated with an past content distribution plans may include an past electronic communication identifier, vector representations of key-value pairs of a past electronic communication, and one or more characteristics of a past content distribution plan, and the like. The electronic communication identifier may uniquely identify a past electronic communication that is generated based on a past content distribution plan. A vector representation of one or more key-value pairs of a past electronic communication may be a vector representation of key-value pairs generated by one or more transformation processes. The characteristics may describe one or more downstream electronic events associated with the electronic communication. For example, a characteristic may be a number or percentage of users of user devices 108A-108C that opened an electronic communication associated with a content distribution plan. In another example, a characteristic may be a number or percentage of users of user devices 108A-108C that engaged a link embedded within an electronic communication. Electronic communications database 112 may be implemented by a database, one or more servers, and the like. Electronic communications database 112 may be embodied by a physical storage device such as, a hard disk drive (HDD), solid state drive (SSD), and the like.

Network controller 114A may receive content distribution plans from client devices 106A-106D and generate electronic communications associated with the content distribution plans. Network controller 114 may receive an content distribution plan comprising a plurality of key-value pairs. For example, a content distribution plan may comprise a "subject" field, a "to" field (that indicates an intended recipient), a "signature" field. Each of these fields may be key in a key-value pair, and the content associated with the field may be the value in a key-value pair. For example, a subject field may contain the text "Important Please Read". In such an instance, subject would be key in the key-value pair, and the text "Important Please Read" would be the value in the key-value pair.

Network controller 114A may determine a transformation process for each key-value pair in order to generate a vector representation for each key-value pair. In some embodiments, a plurality of different algorithms may be used to generate a vector representation of a key-value pair. For example, topic modeling (e.g., Latent Dirichlet Allocation (LDA)), continuous bag-of-words (CBOW), continuous skip-gram, and the like may be utilized to create vector representations. In some embodiments, the algorithm(s) used to generate one or more vector representations may be determined by the key in the key-value pair. For example, any key-value pair with the key of "subject line" may have a vector representation generated using LDA. In such an example, any key-value pair with the key of "body" may have a vector representation generated using CBOW. After generating a vector representation of each key-value pair in a content distribution plan, network controller 114A may transmit each of the generated vector representations as well as the content distribution plan itself to electronic communications database 112 for storage. In some embodiments, network controller 114A, may also generate from a received content distribution plan a plurality of electronic communication(s) and distribute the electronic communication(s) to one or more user devices 108A-108C via network 104B.

Network controller 114B may receive characteristic (i.e. attribute) indications associated with one or more previously distributed electronic communications. A previously distributed electronic communication may be a communication distributed by network management system 102 or another third-party system. Characteristic indications may be an identification of recipient action(s) received from a third party application server or from one or more user devices 108A-108C via network 104B. In some embodiments, after one or more user devices 108A-108C receives an electronic communication, a user using user device may take one or more actions associated with the received electronic communication. For example, recipient actions may include previous user-based actions such as opening an electronic communication, deleting an electronic communication, interacting with a link within an electronic communication, sending an electronic communication to spam, marking an electronic communication as unread, and the like. In such an example, one or more user devices 108A-108C may indicate one or more recipient actions to network controller 114B. In some embodiments, after one or more user devices 108A-108C receives an electronic communication, a user of a user device may take one or more recipient actions that involves a third-party application server. For example, there may be a link within a received electronic communication that, when engaged, routes a user device to a webpage hosted by a third-party application server. A user, via one or more user devices 108A-108C, may perform one or more recipient actions within the webpage, such as purchasing an item, selecting a "remove me" link, completing a survey, and the like. The third-party application server may transmit, to network controller 114B, an identification of a recipient action that identifies one or more recipient actions taken in response to receiving the electronic communication. Network controller 114B, after receiving an indication of a recipient action from one or more user devices 108A-108C and/or from a third-party application server, may update a characteristic associated with an electronic communication and the corresponding content distribution plan. The characteristics associated with a content distribution plan may be included in electronic communication data and may be stored in electronic communications database 112. In some embodiments, network controller 114A and network controller 114B may be implemented as a single device.

Client devices 106A-106D may be operated by a client. A client may be a constructor of a content distribution plan and the construction of an electronic communication may be based on the content distribution plan. In some embodiments, the constructor of an electronic communication may be a cloud-based service provider or users of a cloud-based service provider. Client devices 106A-106D may execute one or more applications that allow the client device to distribute electronic communications, via network management system 102, to user devices 108A-108C.

User devices 108A-108C may be operated by users. User devices 108A-108C may execute one or more applications that allow the user device to receive electronic communications, via network management system 102 and to respond those electronic communications. In some embodiments, the one or more applications executed by user devices 108A-108C may monitor one or more recipient actions associated with a received electronic communication, such as, opening, rejecting, marking as read, deleting, and/or engaging on one or more links within a received electronic communication.

Client devices 106A-106D and user devices 108A-108C may include various types of computing systems, such as portable handheld devices, general-purpose computers (e.g., personal computers and laptops), workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an) iPhone®, tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Figure 2:
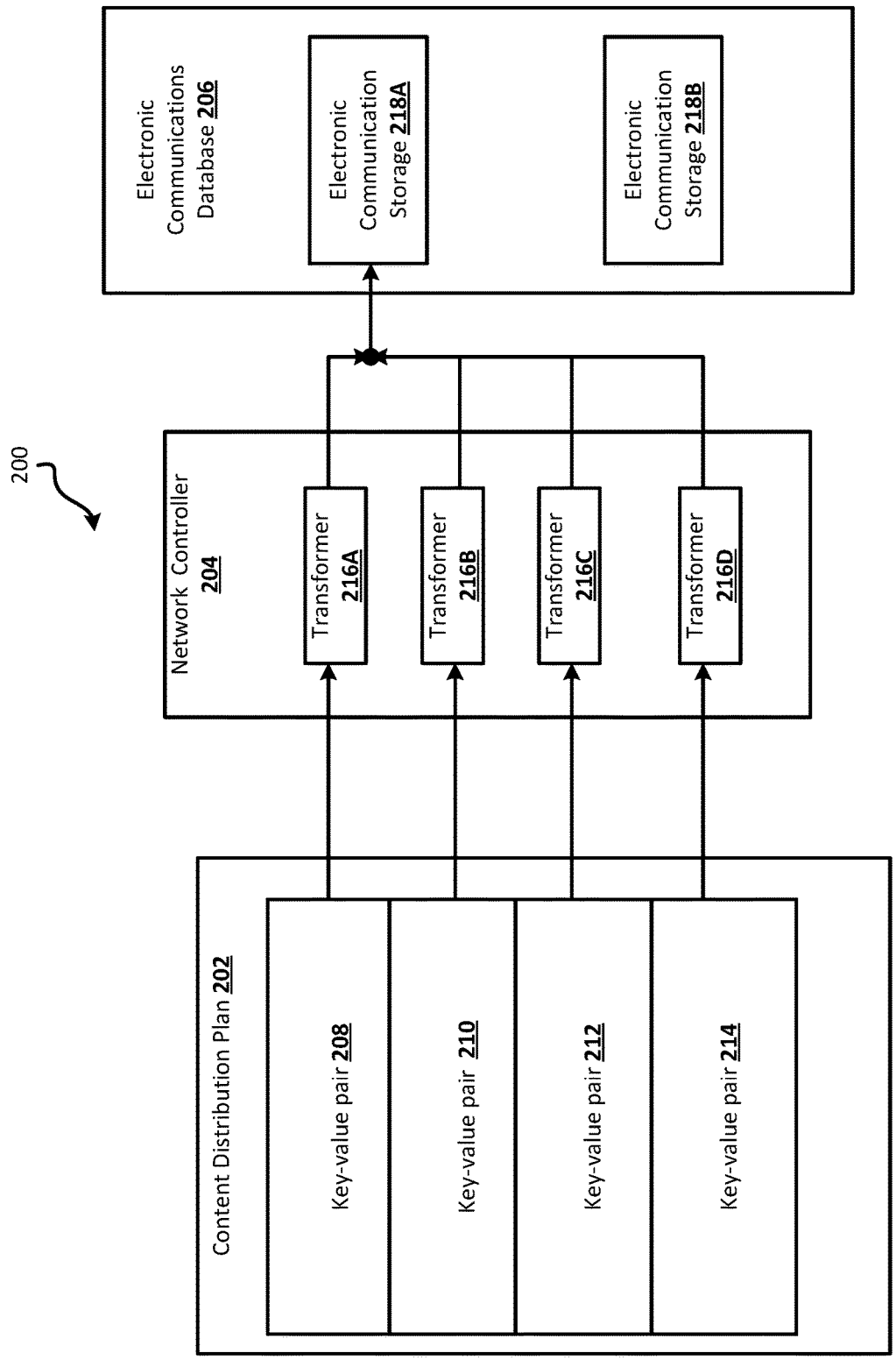
FIG. 2 is a simplified block diagram of a second network environment in accordance with one or more embodiments.

FIG. 2 is a simplified block diagram of network environment 200. Network environment 200 may comprise multiple systems communicatively coupled to each other. The systems in FIG. 2 include one or more content distribution plans 202, one or more network controllers 204 and one or more electronic communications databases 206. Content distribution plan 202 may be a content distribution plan that may be utilized to generated one or more digital communications such as a text message, an e-mail, an e-mail campaign, a social media post or message, and the like. Content distribution plan 202 may include key-value pairs 208-214. Key-value pair 208 may include a key of "recipient" and a corresponding value. For example, the corresponding value may be email addresses of recipients, phone numbers of recipients, social media account identifiers of recipients and the like. Key-value pair 210 may include a key of "subject" and a corresponding value. The corresponding value may be text, emojis, and/or pictures that serve as a subject for electronic communication 202. For example, a subject value may be "Hey Tom! Are you coming to the meeting ☺". Key-value pair 212 may include a key of "body" and a corresponding value. The corresponding value may be text, emojis, and/or pictures that serve as a body of electronic communication 202. For example, a body value may be "We are having a meeting today at 5 pm. However, there will be free refreshments to those who attend". Key-value pair 212 may include a key of "signature" and a corresponding value. The corresponding value may be text, emojis, and/or pictures that serve as a signature for electronic communication 202. For example, a signature value may be "John Jackson, Head of Communications". Key-value pair 214 may include a key of "intended send date" and a corresponding value. The corresponding value may be text that indicates when electronic communication 202 is to be distributed to user devices. For example, a intended send date value may be "December 12 at 3 pm".

Network controller 204 may generate a vector representation of each key-value pairs 208-214. Network controller 204 may comprise of transformers 216A-216D for generating one or more vector representations of electronic communication 202. Network controller 204 may determine which transformer 216A-216D to utilize to transform key-value pairs 208-214, based on the key for each key-value pair. In some embodiments, network controller 204 may query memory associated with network controller 204 using the key in a key-value pair to determine a transformation process that corresponds to the key value. By utilizing a transformation process based on the key in the key-value pair, network controller 204 may similarly process a multitude of electronic communications. For example, key-value pair 210 may comprise a key-value pair comprising a key of "subject line" and the value "Attention Please Read". In such an example, network controller 204 may query memory associated with network controller 204 to locate an entry within the memory to determine which transformer 216A-216D to utilize to generate a vector representation of key-value pair 210. In some embodiments, content distribution plan 202 may be received by network controller 204 via one or more networks.

Each of transformer 216A-216D may be associated with a different vector transformation process. For example, transformer 216A may utilize Word2vec, transformer 216B may utilize Doc2vec, 216C may utilize LDA, and 216D may utilize CBOW. Each transformer 216A-216D may take as an input words, images, text and output a vector representation of the input. Other processes for creating vector representations may be utilized such as Glove by Socher's Research Group, count-based models for word vector representation, word representations via Gaussian embedding, and the like. In some embodiments, by creating vector representations of key-value pairs of content distribution plan 202, similarities may be identified between corresponding key-value pairs of different electronic communications.

After network controller 204 generates, via one or more transformers 216A-216D, one or more vector representations of content distribution plan 202, the vector representations may be stored in electronic communications database 206 in electronic communication storage 218A. Electronic communications database 206 may host a plurality of electronic communication storages (e.g., electronic communication storage 218A-218B). Each of electronic communication storages 218A-218B may contain an different content distribution plan and content distribution plan data. Electronic communication storage 218A may comprise content distribution plan 202, vector representations of key-value pairs of content distribution plan 202, and/or characteristics associated with electronic communication 202. Electronic communication storage 218B may store a content distribution plan and corresponding content distribution plan data of a different content distribution plan. In some embodiments, network controller 204 may be communicatively coupled to electronic communications database 206 via one or more networks.

Figure 3:
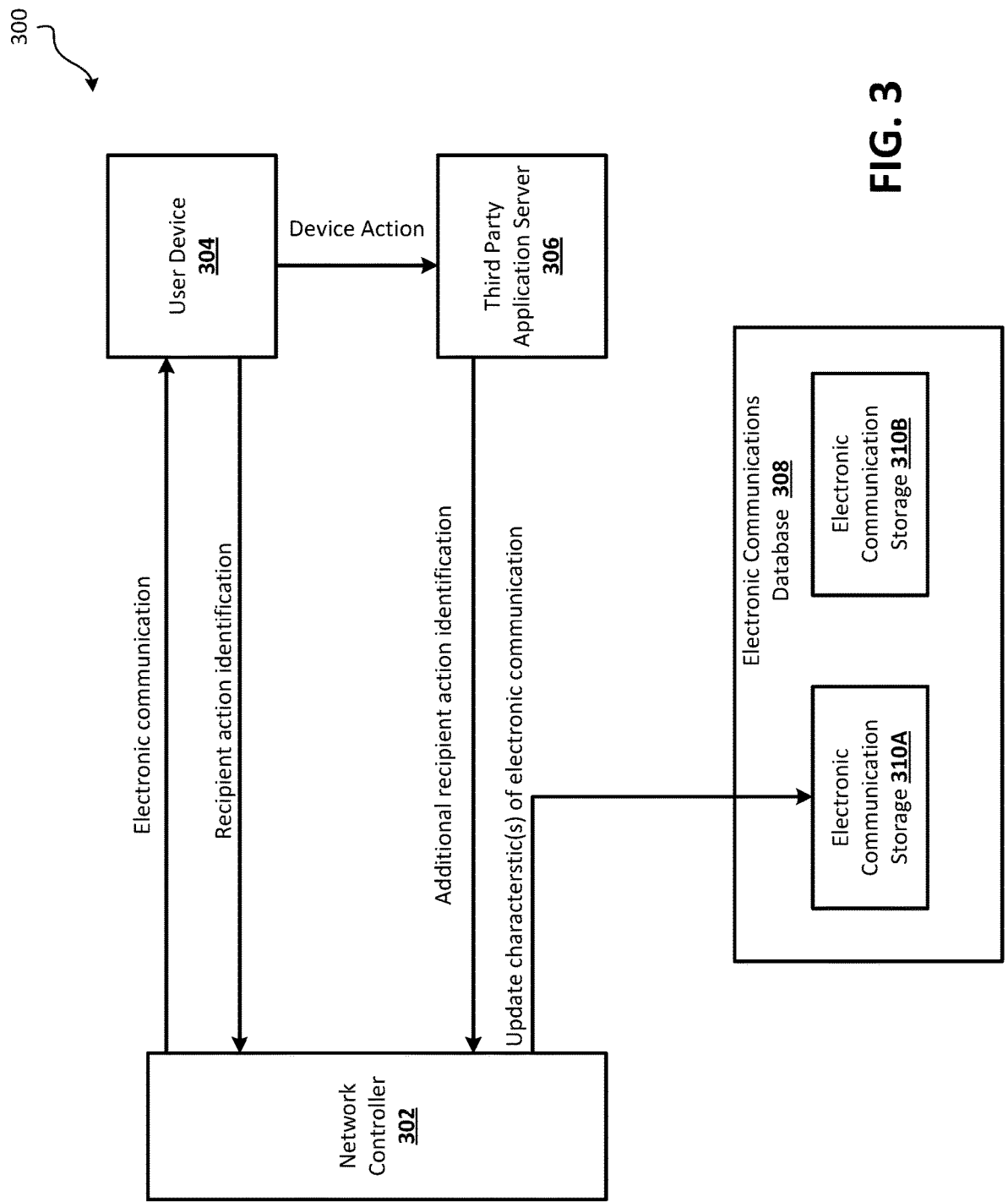
FIG. 3 is a simplified block diagram of a third network environment in accordance with one or more embodiments.

FIG. 3 is a simplified block diagram of network environment 300. Network environment 300 may comprise multiple systems communicatively coupled to each other. Network environment 300 may include network controller 302, user device 304, third-party application server 306, and electronic communications database 308. Network controller 302 may facilitate the distribution of electronic communications and update characteristics associated with content distribution plans based on information received from various sources. Network controller 302 may previously receive a content distribution plan from a client device. Network controller 302 may generated and distribute, to user device 304, an electronic communication based on the content distribution plan. Network controller 302 and user device 304 may be connected via a network.

One or more applications operating on user device 304 may be utilized to receive and/or interact with the received electronic communication. One or more applications may include, for example, an e-mail client, a records viewer, a document viewer, and the like. Upon user device 304 receiving the electronic communication, a user of user device 304 may take several different recipient actions (e.g., downstream electronic events). Depending on which action is taken by the user, the one or more applications operating on user device 304 may send a response to network controller 302. For example, if a user opens the electronic communication, marks the electronic communication as read, marks the electronic communication as unread, deletes the electronic communication, sends electronic communication to a spam folder, does not open the electronic communication within a certain time threshold, declines a calendar invite within the electronic communication, and/or accepts a calendar invite within the electronic communication, the one or more applications operating on user device 304 may send a response comprising a recipient action identification that identifies the recipient action(s) to network controller 302.

In some embodiments, a recipient action may cause user device 304 to perform a device action. For example, a recipient action may be selecting, within a received electronic communication, a link. In such an example, the recipient action may cause user device 304 to load one or more webpages associated with that link (e.g., a device action). The loaded webpages may be provided by third-party application server 306. A webpage may be a webpage for purchasing one or more products, filling out one or more surveys, displaying news, and the like. Once user device 304 has loaded a webpage associated with third-party application server 306, a user may take additional recipient actions associated with the load webpage. For example, a user may purchase one or more products displayed on the webpage, fill out one or more surveys provided by the webpage, select a link or icon on the webpage, and the like. If additional recipient actions are taken, third-party application server 306 may send an additional recipient action identification to identify the additional recipient actions to network controller 302. In some embodiments, if additional recipient actions are taken, third-party application server 306 may send an additional recipient action identification to user device 304, and then user device 304 may forward the additional recipient action identification to network controller 302.

Network controller 302 may update one or more electronic communication storages based on received recipient action identifications and/or received additional recipient action identifications. Electronic communications database 308 can host a plurality of electronic communication storages (e.g., electronic communication storage 310A-310B). Each electronic communication storage 310A-310B may store different electronic communications and corresponding electronic communications data. Electronic communication storage 310A may store the electronic communication distributed by network controller 302 to user device 304 within network environment 300. Electronic communication storage 310A may store (as part of electronic communications data) one or more characteristics associated with the electronic communication. Network controller 302 may update or modify stored characteristics based on received recipient action identifications and/or received additional recipient action identifications. A characteristic may define a degree of efficacy corresponding to transmission of the electronic communication. For example, a characteristic may be the number or percentage of users of user devices that opened or received an electronic communication. When network controller 302 receives a content distribution plan, network controller 302 may identify intended recipients (e.g., users of user devices) of an electronic communication associated with the content distribution plan. At this point, network controller 302 may initialize, within electronic communication storage 310A, an integer (or double) value corresponding to the number or percentage of recipients that open an electronic communication to zero. Network controller 302 may then distribute the electronic communication to the intended recipients. User device 304 may be a intended recipient device. In such an instance, a recipient may be the user of user device 304, if an electronic communication is received by user device 304. The user of user device 304 may then, open the electronic communication. In response, user device 304 may send to network controller 302 a recipient action identification identifying that the user of user device 304 has opened the electronic communication (i.e. a downstream electronic event). In response, network controller 302 may modify the integer value corresponding to the number or percentage of recipients that opened the electronic communication. The same method/process may be applied when additional recipient action identifications are received. In some embodiments, each recipient action identification and/or additional recipient action identification may include an electronic communication identifier, which identifies which electronic communication identifier the recipient action identification and/or the additional recipient action identification is associated with.

FIG. 4 is a simplified content distribution plan database table 402 within an electronic communication database. Content distribution plan database table 402 may be stored in an electronic communications database. Each row in content distribution plan database table 402 may correspond to an electronic communication storage that stores content distribution plan (not pictured) and corresponding electronic communication data. Content distribution plan database table 402 comprises content distribution plan ID column 404, vector representation 1 column 406, vector representation 2 column 408, vector representation 3 column 410, characteristic 1 column 412, and characteristic 2 column 414. Content distribution plan ID column 404 may store a unique identifier that identifies each entry in content distribution plan database table 402. A content distribution plan ID may uniquely identify a content distribution plan and may comprise a numerical value, an alphabetical value, an alphanumerical value, a hash value (of one or more parts of an electronic communication), and the like. In some embodiments, entries within content distribution plan database table 402 may be located by querying content distribution plan database table 402 according to a content distribution plan ID.

Vector representation 1 column 406 may store a first vector representation. The first vector representation may be generated based on one or more first transformation processes. The first transformation processes may be based on a key value in key-value pair within a first key-value pair. The first vector representation may be a single or multi-dimensional vector.

Vector representation 2 column 408 may store a second vector representation. The second vector representation may be generated based on one or more second transformation processes. The second transformation processes may be based on a key value in key-value pair within a second key-value pair. The second vector representation may be a single or multi-dimensional vector.

Vector representation 3 column 410 may store a third vector representation. The third vector representation may be generated based on one or more third transformation processes. The third transformation processes may be based on a key value in key-value pair within a third key-value pair. The third vector representation may be a single or multi-dimensional vector.

In some embodiments, a content distribution plan may define a plurality of key-value pairs that define an electronic communication. Each content distribution plan (and corresponding electronic communication data) stored in content distribution plan database table 402 may have one or more electronic communications generated based on the content distribution plan. The first vector representation, the second vector representation, and the third vector representation may each correspond to different key-value pairs within a content distribution plan. Key-value pairs may include aspects of the content distribution plan including electronic communication metadata. For example, metadata may contain the time an electronic communication is to be sent, a thread topic, language of the electronic communication, and the like. Each of these pieces of metadata may be associated with its own key-value pair. For example, a key could be "thread topic" and the value could be "John's Retirement". In such an embodiment, a vector representation for the key-value pair may be generated based on the key "thread topic". Thus, key-value pairs may represent content that comprises an electronic communication as well as metadata associated with the electronic communication.

Characteristic 1 column 412 may store a value associated with a content distribution plan. Characteristic 1 column 412 may store an integer that indicates a number or percentage of recipients that opened an electronic communication. Characteristic 1 column 412 may be updated based on received recipient action identifications and/or additional recipient action identifications. As depicted in FIG. 4, characteristic 1 column 412 displays a percentage of recipients that opened an electronic communication (e.g., 80%, 50%, 85%).

Characteristic 2 column 414 may store a value associated with a content distribution plan. Characteristic 2 column 414 may store an integer that indicates a number or percentage of recipients that engaged a link embedded within an electronic communication. Characteristic 2 column 414 may be updated based on received recipient action identifications and/or additional recipient action identifications. As depicted in FIG. 4, characteristic 2 column 414 displays a percentage of recipients that engaged a link within an electronic communication (e.g., 75%, 30%, 25%). Many more characteristic columns may be stored in content distribution plan database table 402. Each characteristic may define a different degree of efficacy corresponding to transmission of an associated electronic communication. A degree of efficacy may an indication of a quantity of user devices that receive an electronic communication and/or an indication of recipient actions associated with a received electronic communication (i.e. downstream electronic events). Each characteristic may indicate a different recipient action associated with an electronic communication. Keeping characteristics associated with electronic communications may aid in determining the effectiveness of a content distribution plan and electronic communications based on that content distribution plan.

Content distribution plan database table 402 may additionally store the electronic communication associated with a content distribution plan ID. In some embodiments, content distribution plan database table 402 may store an content distribution plan data. Data within the content distribution plan ID column 404, vector representation 1 column 406, vector representation 2 column 408, vector representation 3 column 410, characteristic 1 column 412, and characteristic 2 column 414 may be considered content distribution plan data.

Figure 5:
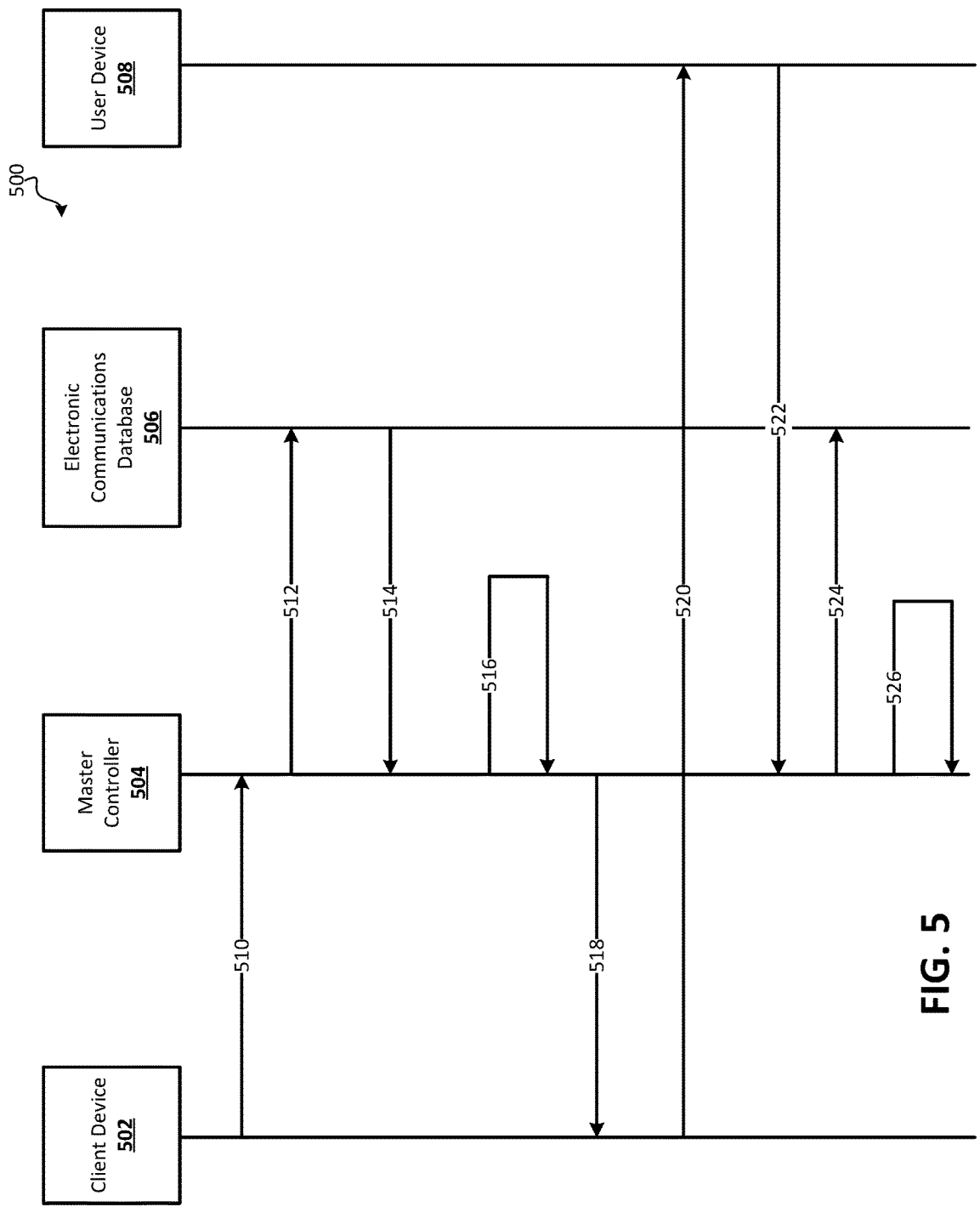
FIG. 5 is a simplified signal diagram of operations within an network environment in accordance with one or more embodiments.

FIG. 5 is a simplified signal diagram of operations within network environment 500. Network environment 500 may comprise client device 502, master controller 504, electronic communications database 506, and user device 508. In some embodiments, master controller 504 and electronic communications database 506 may be part of a network management system. Master controller 504 may be communicatively coupled to client device 502 by a network connection. Master controller 504 may be communicatively coupled to user device 508 by the same or a different network connection. Master controller 504 may be responsible for receiving a new content distribution plan, and transmitting, based on past electronic communications and a machine learning model, a payload output to client device 502. Client device 502 may modify one or more aspects of the new content distribution plan based on the received payload output and generate new electronic communications based on the new content distribution plan. The new electronic communications may then be transmitted to user device 508. User device 508 may then send a response to master controller 504 and master controller 504 may update electronic communications database 506 and retrain the machine learning model based on the received response from user device 508.

At 510, client device 502 may transmit a new content distribution plan and a characteristic identification to master controller 504. The new content distribution plan may be a paradigm for generating new electronic communications. The new content distribution plan may consist of a plurality of key-value pairs that define a new electronic communication. The new content distribution plan may comprise completed and incomplete key-value pairs. For example, a new content distribution plan may comprise a key of "subject line", a key of "body", and a key of "signature". In another example, a new content distribution plan may comprise a first key-value pair consisting of the key "subject line" and a value of "Attention Please Read", a second key-value pair consisting of the key "body" and a value of "According to office security policies, please select the following link to update your security profile for this computer", a third key-value pair consisting of the key "signature", but no corresponding value. The third key-value pair may be an incomplete key value-pair because there is no corresponding value. However, the first and second key-value pairs may be completed key-value pairs because there is a corresponding value. An incomplete value in a key-value pair may be detected by master controller 504 by different methods. In some embodiments, an incomplete value in a key-value pair may be detected by an overt user action. For example, a user of client device 502 may select an icon associated with a key-value pair that indicates the key-value pair is incomplete. In some embodiments, an incomplete value in a key-value pair may be detected by the value of a key-value pair being left blank (e.g., no text, image, or content is present). A complete value in a key-value pair may be detected by master controller 504 by different methods. In some embodiments, a complete value in a key-value pair may be detected by an overt user action. For example, a user of client device 502 may select an icon associated with a key-value pair that indicates the key-value pair is complete. In some embodiments, all other key-value pairs except incomplete key-value pairs may be completed key-value pairs.

The characteristic identification may identify a desired characteristic associated with the new content distribution plan. The characteristic identification may identify a desired metric associated with the new content distribution plan. For example, a characteristic identification may indicate a desired metric of at least 80% of the recipients who receive a new electronic communication that is based on the new content distribution plan open the new electronic communication, have at least 50% recipients not delete the new electronic communication when they receive it (or within a certain time threshold), have at least 90% of the recipients select a link within the new electronic communication, have at least 80% recipients open the new electronic communication and of those 80% have at least 30% engage a link within the new electronic communication, and the like. The characteristic identification may include one or more desired characteristics.

At 512, master controller 504 may query electronic communications database 506 for similar past electronic communications. Master controller 504 may determine or receive (from an associated network controller) vector representations of completed key-value pairs of the new content distribution plan. The transformation process for generating a vector representation of a key-value pair may be determined by a key in a corresponding key-value pair. Electronic communications database 506 may comprise a plurality of electronic communication storages that each contain a past content distribution plan and corresponding content distribution plan data. The content distribution plan data may be comprise vector representations of completed key-value pairs within a past content distribution plan. A machine learning model may be trained based on the vector representations of past content distribution plan. The machine learning model may cluster or group together similar past electronic communications based on their corresponding vector representations. In some embodiments, the machine learning model may determine similar past content distribution plan by determining the Cosine similarity or Euclidian distance between vector representations of past content distribution plan. Master controller 504, may utilize the machine learning model to identify, based on vector representations of past content distribution plans and vector representations of the new content distribution plan, a group of similar past communications. In some embodiments, a similarity score may be produced that indicates the similarity between the vector representation of past content distribution plans and vector representations of the new content distribution plan. The group of similar past content distribution plans may identify past content distribution plans that are similar to the new content distribution plan. In some embodiments, the group of similar past content distribution plan may be identified based on the Cosine similarity or Euclidian distance between the vector representations of the new content distribution plan and the vector representations of past content distribution plans. For example, in order for a past content distribution plan to be included in the group of similar past content distribution plan, the vector representations of the past content distribution plan may be below a certain Euclidian distance threshold with respect to the vector representations of the new content distribution plan. In such an example, the Euclidian distance threshold may be less than 20, as a value of 0 may indicate two vectors are exactly the same and a value of 100 may indicate two vectors are very different.

In some embodiments, the master controller 504 may determine the similarity between a past content distribution plan and the new content distribution plan based on a comparison of corresponding vector representations. Master controller 504 may identify which vector representations of past content distribution plan correspond to a vector representation of the new content distribution plan by determining vector metadata associated with each vector representation. In some embodiments, whenever a vector representation is created of a key-value pair, vector metadata may be created that identifies the key of the corresponding key-value pair. Corresponding vector representations may be vector representations (from a new content distribution plan and/or past content distribution plans) that share the same key. For example, a new content distribution plan may have vector representations of a first key-value pair with a key of "to", a second key-value pair a key of "subject line", and a third key-value pair "signature". Master controller 504 may compare the new content distribution plan's vector representation of the first key-value pair to one or more past content distribution plan's vector representations with the same key of "to" to determine a plurality of first similarity scores for one or more past content distribution plan. The first similarity scores may be a percentage or numerical value that indicates the similarity between two vector representations associated with the key of "to". Similarly, master controller 504 may compare the new content distribution plan's vector representation of the second key-value pair to one or more past content distribution plan's vector representations with the same key of "subject line" to determine a plurality of second similarity scores for one or more past content distribution plan. The second similarity scores may be a percentage or numerical value that indicates the similarity between two vector representations associated with the key of "subject line". A similar process may be used to determine a third similarity score for vector representations associated with the key of "signature". In some embodiments, master controller 504 may add or average the similarity scores associated with each key to determine an overall similarity score. Past content distribution plan that have a similarity score over (or under) a certain threshold may be determined to be similar past content distribution plan. Master controller 504 may determine which past content distribution plan are similar to the new content distribution plan based on vector representations of past content distribution plan and vector representations of a new content distribution plan. In some embodiments, the past content distribution plans and the new content distribution plan have the same key values (e.g., same fields that make up a content distribution plan).

In some embodiments, master controller 504 may determine the similarity between a past content distribution plan and the new content distribution plan based on a partial overall vector representation of a new content distribution plan. Master controller 504 may concatenate all the vector representations of completed key-value pairs of the new content distribution plan to form a partial overall vector representation. The overall vector representation may be a partial because it does not include a vector representation of one or more incomplete key-value pairs. This is in contrast to concatenated vector representations of past content distribution plans which contain no incomplete key-value pairs and are overall vector representations. For example, the new content distribution plan and the past content distribution plans may have 5 unique segments with 5 respective unique key-value pairs. A partial overall vector representation associated with the new content distribution plan may contain vectors representations for 4 out of the 5 segments (i.e., one incomplete key-value pair). In such an instance, master controller 504 may identify a comparison section of one or more overall vector representations of past content distribution plans that are associated with the same 4 segments and compare the comparison section of the overall vector representations to the partial overall vector representation. Based on the comparisons between the comparison sections of the overall vector representations of the past content distribution plans and the partial overall vector representation of the new content distribution plan, a similarity score may be determined for each past content distribution plan. Past content distribution plans that have a similarity score over (or below) a certain threshold may be determined to be a group of similar past content distribution plan.

At 514, once the group of similar past content distribution plan is identified, master controller 504 retrieves from electronic communications database 506 each past content distribution plan in the group of similar past content distribution plan. At 516, master controller 504 may process the group of similar past content distribution plan in order to determine an output. The group of similar past communications may be processed based on several different factors. In some embodiments, each past content distribution plan in the group of similar past content distribution plan may have an associated similarity score indicating how similar the past content distribution plan is to the new content distribution plan. In such an embodiment, the group of similar past content distribution plan may be processed to generate a ranked list that is ranked based on each past content distribution plan's similarity score. In some embodiments, the group of similar past content distribution plans may be grouped into clusters based on similarity scores associated with each past content distribution plan. For example, past content distribution plans with a similarity score between 100% and 80% may be in a first group and past content distribution plans with a similarity score between 80% and 50% may be in a second group.

Master controller 504 may utilize a machine learning model to further process the group of similar past content distribution plan based on characteristics associated with past content distribution plans. The characteristic identification may identify a desired metric associated with the new content distribution plan. The characteristic identification may also correspond to one or more characteristics associated with past content distribution plans. For example, a characteristic identification may be to have at least 80% of recipients open a new electronic communication generated based on the new content distribution plan. In such an example, there may be a characteristic associated with each past content distribution plan indicating a percentage or number of recipients that opened the past electronic communication associated with the past content distribution plan. Master controller 504 may process the group of similar past content distribution plan to generate a ranked list, wherein higher ranked past content distribution plans may have a characteristic that indicates higher percent or numerical value associated with the corresponding characteristic identification. In another example, a characteristic identification may be to have a new electronic communication generated based on the new content distribution plan be successfully delivered to at least 90% of intended recipients. In such an example, there may be a characteristic associated with each past content distribution plans indicating a percentage or number of intended recipients that successfully received a past electronic communication. In some embodiments, an electronic communication may not be successfully received if it is filtered to spam, blocked by a firewall, and the like. One or more applications on a user device may indicate successful receipt of an electronic communication so that the characteristic value associated with each past content distribution plan may be kept updated.

Master controller 504 may cluster together one or more past content distribution plans of the group of similar past content distribution plan based on the received characteristic identification and characteristics associated with the past content distribution plans. For example, a characteristic identification may indicate to have at least 20% of recipients purchase a product advertised in a new electronic communication generated based on the new content distribution plan. In such an example, there may be a characteristic associated with each past content distribution plan indicating a percentage or number of recipients that purchased a product advertised in a corresponding past electronic communication. Master controller 504 may cluster into groups, past content distribution plans based on the characteristic. For example, master controller 504 may group into a first group past content distribution plans wherein a characteristic indicates that 20%-40% of recipients purchased a product advertised in a corresponding past electronic communication and master controller 504 may group into a second group past content distribution plans wherein the characteristic indicates that 10%-20% of recipients purchased a product advertised in a corresponding past electronic communication. It may be noted that past content distribution plans in the group of similar past content distribution plans may still be processed even if their characteristic value is below (or above) a received characteristic identification threshold value.

In some embodiments, master controller 504 may leverage a machine learning model to determine predictive characteristics associated with a new content distribution plan. The machine learning model may take as input a vector representation or an identifier associated with one or more past content distribution plan and a vector representation or an identifier associated with the new content distribution plan. Multiple vector representations can then be generated, where all of the vector representations include representations of the one or more completed key-value pairs but each of the vector representations further represent a different possible value for an incomplete pair within the new content distribution plan. Each of the different possible values can correspond to a different content distribution plan. Each vector representation can then be processed by the machine learning model to predict a characteristic for an associated potential completion of the content distribution plan. Thus, for each similar past content distribution plan, one or both of a similarity score and a predicted characteristic representative of predicted downstream electronic event occurrences can be identified.

At 518, after the group of similar past content distribution plan is processed, master controller 504 may transmit an output to client device 502. The output may comprise the processed group of similar past content distribution plan and predictive downstream electronic event occurrences. In some embodiments, the output may comprise a grouped, clustered, or ranked listing of the group of similar past content distribution plans. In some embodiments, the output may contain a single past content distribution plan. The single past content distribution plan may be the highest ranked past content distribution plan after processing the group of similar past content distribution plans. In some embodiments, the output may be a completed key-value pair of the highest ranked past content distribution plan that corresponds to an incomplete key-value pair of the new content distribution plan. For example, if the key of "subject line" is incomplete in the new content distribution plan, the output may be a value, from a past electronic content distribution plan, for the key of "subject line". In some embodiments, the output may include display instructions that may indicate, to a receiving client device, relative spatial constraints (e.g., visual organization) associated with the presentation of the similar past content distribution plans. The relative spatial constraints may include an identification of a particular ranking, grouping, clustering, and the like of the similar past content distribution plans. In some embodiments, master controller 504 utilizes a machine learning word model to determine the output. In some embodiments, the machine learning word model, having in its training data similarities between vector representations, may modify or alter a past content distribution plan's value and return the modified value as the output. For example, a past content distribution plan's key-value pair may be "subject line" and "Excuse Me, Please Read". The machine learning word model may, based on its training data, recognize a similar term to "Excuse Me" such as "Pardon". The machine learning word model, based on its training data, may recognize that past content distribution plan using the term "Pardon" as opposed to "Excuse Me" may result in more recipients opening an electronic communication associated with a content distribution plan. Thus, the machine learning word model's ability to recognize similarities between words and terms may be utilized to modify the value "Excuse Me, Please Read" to "Pardon, Please Read" and return a unique value as the output.

After client device 502 receives the output, the user of client device 502 may implement the output to complete the incomplete key-value pair. The client device may generate a presentation (e.g., as a webpage interface) based on the received output (e.g., received display instructions) in an indicated order, group, cluster or the like (e.g., relative spatial constraints). The presentation may be configured to receive an input that corresponds to a selection of one of the similar past communications. For example, the output may comprise a grouped, clustered, or ranked listing of the group of similar past content distribution plans. In such an example, client device 502 may display, to a user, the grouped, clustered, or ranked list of the group of similar past content distribution plan along with one or more characteristics associated with each past content distribution plan. A user of client device 502 may select a past content distribution plan from the group of similar past content distribution plans. The corresponding completed key-value pair from the selected past content distribution plan may be utilized to complete the corresponding incomplete key-value within the new content distribution plan. For example, the new content distribution plan may comprise an incomplete key-value pair with a key of "body". In such an example, a user of client device 502 may select a displayed past content distribution plan of the group of similar past content distribution plan and in response, client device 502 may copy a value from the selected past content distribution plan that is associated with the key of "body". The copied value may be pasted into the new content distribution plan communication to complete the incomplete key-value pair. In some embodiments, when a received output comprises a single past content distribution plan or a single key-value pair, client device 502 may complete the incomplete key-value pair of the new content distribution plan using the received single past content distribution plan or single key-value pair. In some embodiments, master controller 504 may complete the incomplete key-value pair of the new content distribution plan using the transmitted single past content distribution plan or transmitted single key-value pair in order to automate the process of generating a value for an incomplete key-value pair. One or more processes associated with 510-518 may be repeated for additional incomplete key-value pairs that may exist at this point.

At 520, client device 502 transmits a new electronic communication based on the new content distribution plan with all completed key-value pairs (e.g., no remaining incomplete key-value pairs) to user device 508. In some embodiments, client device 502 generates a plurality of new electronic communications based on the key-value pairs of the new content distribution plan. Client device 502 may then transmit the new electronic communication(s) via one or more network connections. In some embodiments, client device 502 may transmit the new electronic communication(s) to master controller 504 (or one or more other parts of a network management system) and master controller 504 (or one or more other parts of the network management system) may distribute the new electronic communication(s) to user device 508 and a plurality of other user devices.

At 522, user device 508 may transmit a response to the received electronic communication. The response may indicate various recipient actions taken by a user of user device 508. For example, a user of user device 508 may open, delete, send to spam, or mark as unread the received electronic communication. In such an example, user device 508 may indicate one or more recipient actions in a response to master controller 504. In some embodiments, a third-party application server may send, to master controller 504, additional recipient action identification that identifies additional user actions.

At 524, master controller 504 may update a characteristic associated with transmitted new electronic communication. Upon transmitting the new electronic communication to user device 508, the corresponding new content distribution plan and corresponding content distribution plan data may be stored to electronic communications database 506. Master controller 504 may update characteristics (stored within electronic communication data) associated with the new electronic communication based on received responses from user device 508 and/or third-party application servers.

At 526, master controller 504 may update and/or retrain its machine learning model based on the distributed new electronic communication and its characteristics. Retraining the machine model based on new electronic communications may allow the machine learning model to identify new trends and similarities between words and terms. For example, over time electronic communications with terms such as "Urgent", "Attention", or similar terms may be increasing rejected by firewalls associated with user devices. In such an instance, characteristics associated with electronic communications containing those terms, for example, in a subject line, may indicate a decreased likelihood of the electronic communication being successfully received by an intended recipient. Such information may aid the machine learning model in predicting downstream electronic events associated with new electronic communications.

Figure 6:
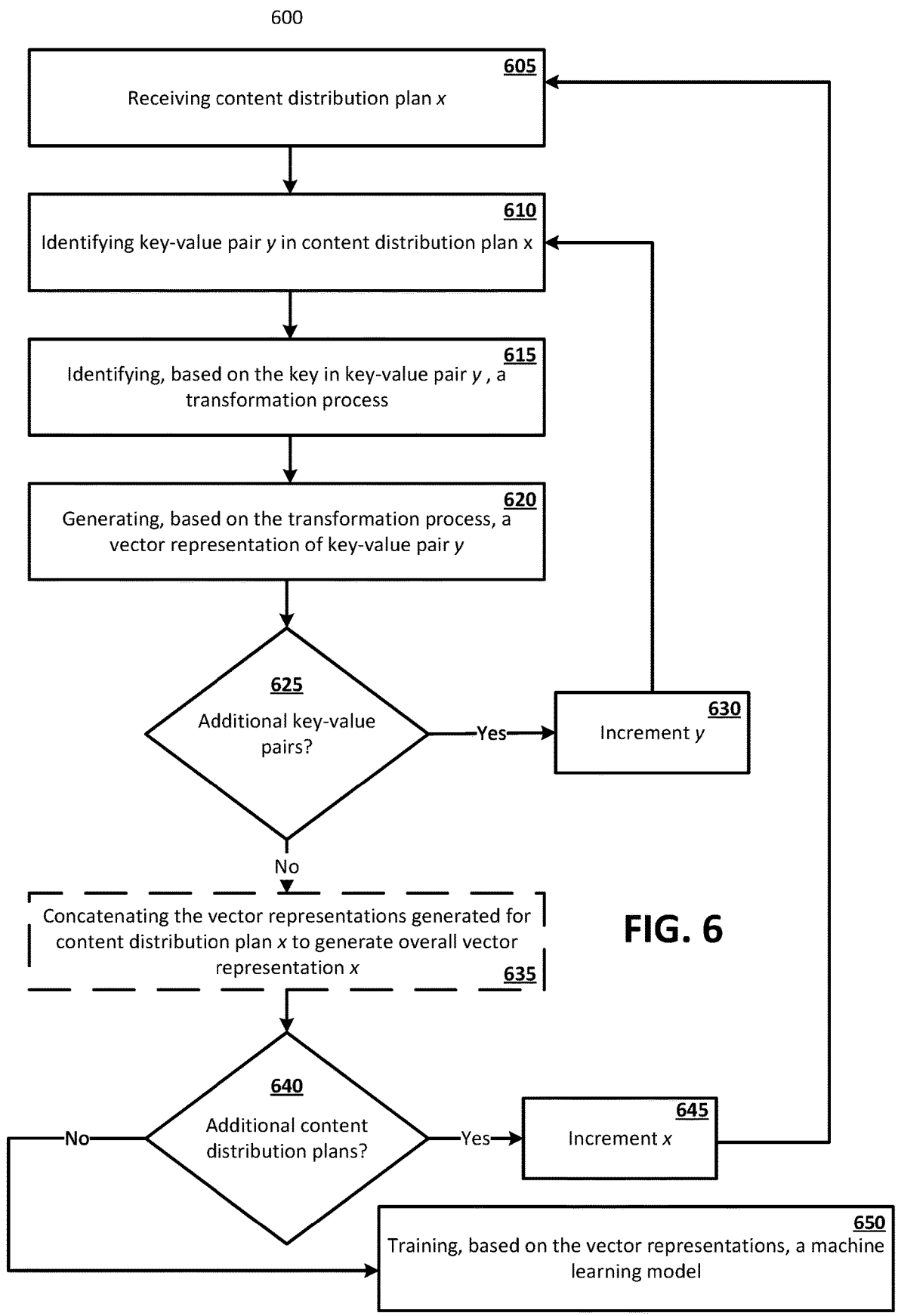
FIG. 6 illustrates an exemplary first process in accordance with one or more embodiments.

FIG. 6 is a simplified process 600 for training a machine learning model associated with a network management system. Process 600 may be performed by one or more or more parts of a network management system within a network environment. At 605, the network management system receives content distribution plan x. Variable x may be initially set to 1 and may be incremented as necessary throughout process 600. For simplicity of explanation, process 600 may be explained using a first content distribution plan (e.g., variable x equal to 1). The first content distribution plan may be received from a client device or from an electronic communication server (e.g., a third-party server). An electronic communication server, may be a server that is responsible for distributing one or more electronic communications. In some embodiments, the network management system may operate as an electronic communication server.

At 610, the network management system identifies key-value pair y in the first content distribution plan. Variable y may be initially set to 1 and may be incremented as necessary throughout process 600. For simplicity of explanation, process 600 may be explained using a first key-value pair (e.g., variable y equal to 1). The first key-value pair may be identified by identifying a first payload segment of the first content distribution plan. In some embodiments, each payload segment may comprise a key-value pair. In some embodiments, each received content distribution plan may have a predetermined set of payload segments. For example, each content distribution plan may have 5 unique payload segments, and each payload segment may have a unique key-value pair. In such an example, the 5 unique payload segments may be associated with different parts of a content distribution plan (e.g., subject line, body, signature, intended recipients, images, etc.).

At 615, the network management system identifies, based on the key in the first key-value pair, a transformation process. A transformation process may be a process to generate a vector representation of a first key-value pair. The transformation process utilized to create a vector representation may depend on the key in the first key-value pair, such that key-value pairs with the same key, across different electronic communications, may be transformed by the same transformation process.

At 620, the network management system generates, based on the identified transform process, a vector representation of the first key-value pair. In some embodiments, the vector representation may be for the both the key and value in the key-value pair. In some embodiments, only the value of the key-value pair is transformed into the vector representation. In some embodiments, vector metadata may be generated that identifies the transformation process utilized to generate the vector representation and/or a key in the key-value pair.

At 625, the network management system determines if there are additional key-value pairs within the first content distribution plan. Each content distribution plan may have a plurality of payload segments and thus a plurality of key-value pairs. If there are additional key-value pairs that do not have a vector representation generated, then at 630 variable y is incremented and process 600 returns to process 610. However, if there are not additional key-value pairs then process 600 moves to 635.

At 635, the network management system may optionally concatenate the vector representations generated for the first content distribution plan to generate a first overall vector representation. Alternatively, the network management system may not concatenate the vector representations generated for the first content distribution plan.

At 640, the network management system determines if there are additional content distribution plan. Network management system may utilize a plurality of content distribution plan to train the machine learning model. If there are additional content distribution plan that do not yet have vector representations then process 600 moves to 645 and variable x is incremented and process 600 returns to 605. However, if there are not additional content distribution plans then process 600 moves 650 and the network management system trains, based on the generated vector representations, the machine learning model. The machine learning model may be trained by vector representations (e.g., concatenated or non-concatenated) of content distribution plans in order to identify similarities between past content distribution plans and a new content distribution plan to be received.

Figure 7:
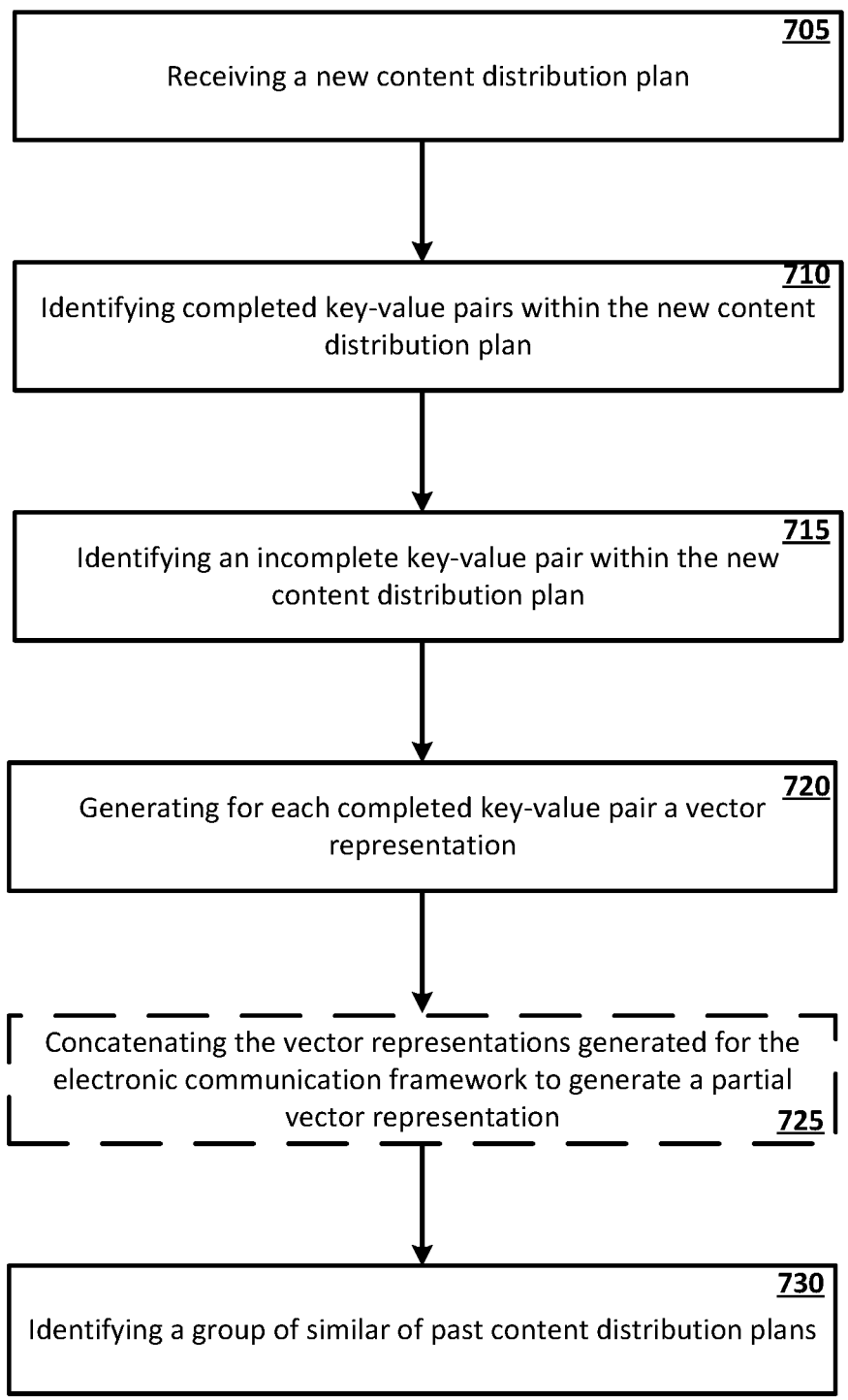
FIG. 7 illustrates an exemplary second process in accordance with one or more embodiments.

FIG. 7 is a simplified process 700 for identifying a group of similar past communications that a similar to a new content distribution plan. Process 700 may be performed by one or more or more parts of a network management system within a network environment. At 705, the network management system receives a new electronic communication.

The content distribution plan may be based on an electronic communication framework. The electronic communication framework may be paradigm for generated a new electronic communication. The new content distribution plan may be received from a client device via a network. The new content distribution plan may comprise a plurality of key-value pairs. In some embodiments, each of the plurality of key-value pairs of the new content distribution plan may correspond to a key-value pair of one or more past electronic communications that are stored within the network management system. For example, the new content distribution plan and past electronic communications may comprise a "subject" field, a "to" field (that indicates a recipient of the electronic communication), a "signature" field. Each of these fields may correspond to a key in a key-value pair. In some embodiments, a past electronic communication may be an electronic communication that has been distributed (or attempted to be distributed) to intended recipients. In some embodiments At 710, the network management system identifies completed key-value pairs within the new content distribution plan. The network management system may first identify key-value pairs within the new content distribution plan and then determine one or more key-value pairs are completed a key-value pairs. In some embodiments, a user associated with the new content distribution plan may indicate to the network management system, which key-value pairs are completed.

At 715, the network management system identifies an incomplete key-value pair within the new content distribution plan. The network management system may first identify key-value pairs within the new content distribution plan and then determine if one or more key-value pairs is an incomplete key-value pair. In some embodiments, a user associated with the new content distribution plan may indicate to the network management system, which key-value pair is incomplete.

At 720, the network management system generates for each completed key-value pair a vector representation. The vector representation may be generated by a transformation process. The transformation process may be determined based on the key in the key-value pair. The vector representation may be a single dimension or a multi-dimensional vector.

At 725, the network management system may optionally concatenate the generated vector representations to generate a partial overall vector representation. Alternatively, the network management system may not concatenate the vector representations generated for the new content distribution plan.

At 730, the network management system identifies, a group of similar past content distribution plans. The network management system may receive the vector representations of the new content distribution plan and determine a similarity score between vector representations of the new content distribution plan and the vector representations of past content distribution plans. Past content distribution plans with a similarity score above (or below) a certain threshold may be part of the group of similar past content distribution plans. In some embodiments, the network management system may determine a similarity score by determining the Euclidean distance or the Cosine similarity between the partial overall vector representation associated with the new content distribution plan and one or more overall vector representations associated with one or more past content distribution plans. In some embodiments, the network management system may determine a similarity score by determining the Euclidean distance or the Cosine similarity between individual vector representations of the new content distribution plan and corresponding vector representations of the past content distribution plans. For example, a first similarity score may be generated between vector representations associated with a new content distribution plan and past content distribution plans with the keys of "body". In addition, a similar second similarity score may be generated between vector representations associated with a new content distribution plan and past content distribution plans with the keys of "signature". The first and second similarity score, although individually determined, may be combined (e.g., averaging the scores) to determine an overall similarity score between the new content distribution plan and one or more past content distribution plans.

Figure 8:
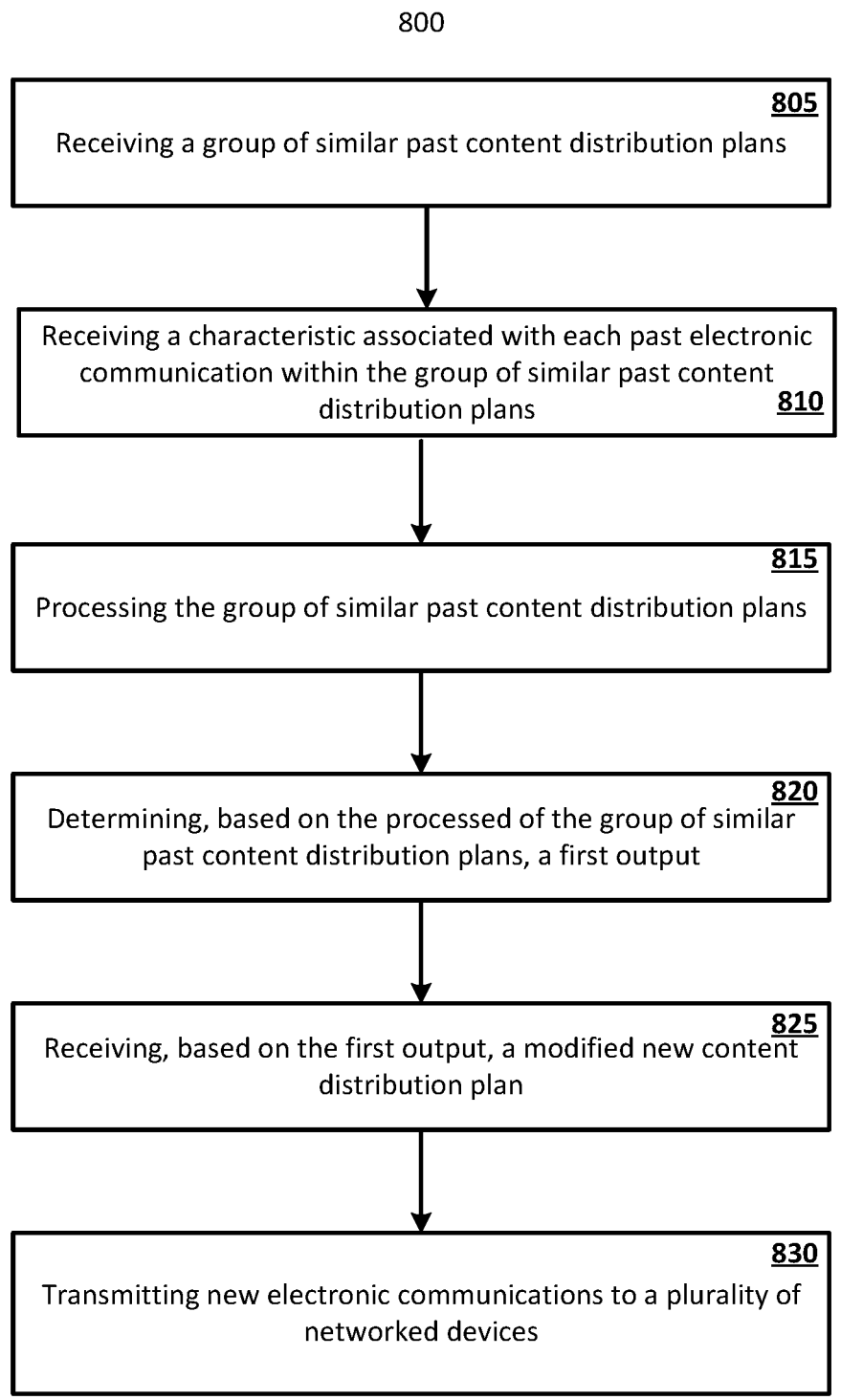
FIG. 8 illustrates an exemplary third process in accordance with one or more embodiments.

FIG. 8 is a simplified process 800 for distributing a new electronic communication. Process 800 may be performed by one or more or more parts of a network management system within a network environment. At 805, the network management system, receives a group of similar past content distribution plan. The group of similar past content distribution plans may be determined based on a similarity score between past content distribution plans and a new content distribution plan. The new content distribution plan may contain completed key-value pairs and an incomplete key-value pair while the past content distribution plans may contain all completed key-value pairs. The group of similar past content distribution plans may contain past content distribution plans that are similar to the completed key-value pairs within the new content distribution plan.

At 810, network management system receives a characteristic associated with each past content distribution plan within the group of similar past content distribution plan. The characteristic may indicate one or more recipient actions associated with the content distribution plan. For example, the characteristic may indicate how many times a past electronic communication associated with a past content distribution plan was opened by a recipient. In another example, the characteristic may indicate a percentage of intended recipients that successfully received a past electronic communication (e.g., the electronic communication as not blocked by a firewall).

At 815, network management system processes the group of similar past content distribution plan. The group of similar past communications may be processed based on one or more characteristics associated with each past content distribution plan within the group of similar past content distribution plans. In some embodiments, network management system may receive a characteristic identification. The characteristic identification may identify a desired metric associated with the new content distribution plan. The characteristic identification may correspond to one or more characteristics associated with past content distribution plans. The network management system may leverage the machine learning model to cluster, group, rank, or otherwise process each past content distribution plan within the group of similar past content distribution plans based on their characteristics. For example, the machine learning model may be used to predict a characteristic representing downstream electronic events if an incomplete key-value pair within the new content distribution plan were to be completed in accordance with a particular value associated with a particular completed key-value pair in a past content distribution plan within the group of similar past content distribution plans. More specifically, the machine-learning model can be configured to receive an input that includes a full representation of a new content distribution plan (e.g., an overall vector representation) and to output a predicted characteristic for the new content distribution plan. Each of the different possible values can correspond to a different past content distribution plan represented in the group of similar past content distribution plans. Each vector representation can then be processed by the machine-learning model to predict a characteristic for an associated potential completion of the content distribution plan. Thus, for each similar past content distribution plan, one or both of a similarity score and a predicted characteristic representative of predicted downstream-electronic-event occurrences can be identified. The predicted characteristic may be a confidence interval. For example, the machine learning model may predict that if a first value from a first past content distribution plan is utilized to complete an incomplete key-value pair in the new content distribution plan then there is a certain likelihood (e.g., 50%, 60%, 70%, etc) that a particular characteristic will be achieved (e.g., 80% of people will open a corresponding new electronic communication. Similarly, the machine learning model may predict that if a second value from a second past content distribution plan is utilized to complete the same incomplete key-value pair in the new content distribution plan then there is a certain likelihood (e.g., 20%) that the same (or another) particular characteristic will be achieved (e.g., 80% of people will open a corresponding new electronic communication).

At 820, the network management system determines, based on the processed group of similar past communications, a first output. The first output may comprise the processed group of similar past content distribution plans. In some embodiments, the first output may comprise a grouped, a clustered, or a ranked listing of the group of similar past content distribution plans. In some embodiment, the first output may contain a confidence interval associated with each of the past content distribution plans. In some embodiments, the first output may contain a single past content distribution plan. In some embodiments, the first output may contain candidate values associated with each past content distribution plan. The candidate value may be value within the past content distribution plans that corresponds to the incomplete key-value pair within the new content distribution plan. The first output may be transmitted to a client device.

At 825, the network management system receives, based on the first output, a modified new content distribution plan. In some embodiments, the first output is received by a client device and a user of the client device may determine, based on the first output, how to complete an incomplete key-value pair within the new content distribution plan. The incomplete key-value pair of the new content distribution plan may be completed to generate a modified new content distribution plan. The modified new content distribution plan may be received by the network management system. In some embodiments, the network management system may modify an incomplete key-value pair of the new content distribution plan based on the first output. For example, the first output may comprise a single key-value pair from a past content distribution plan that corresponds to an incomplete key-value pair within the new content distribution plan. In such an example, the network management system may insert the value (or a modification to the value) from the single key-value pair from the past content distribution plan into the corresponding incomplete value in the new content distribution plan to generate the modified new content distribution plan. The modified new content distribution plan may be referred to as a completed content distribution plan if all of the key-value pairs within the modified new content distribution plan are completed key-value pairs. In some embodiments, the first output may contain a plurality of candidate values instead of a single key-value pair. The plurality of candidate values may be values of key-value pairs from the group of similar past content distribution plans that are associated with the incomplete key-value pair within the new content distribution plan. In some instances, the first output may comprise the plurality of candidate values such that the modified new content distribution plan may be completed by selecting one of the candidate values. In such instances, the first output may display the plurality of candidate values in some particular order, format, and/or ranking. In some instances, the first output may include the plurality of candidate values and one of the candidate values may be automatically selected and utilized to generate the modified new content distribution plan. In some embodiments, the automatic selection may be based on a rank associated with each of the candidate values such that the automatic selection selects the highest ranked candidate value and completes the incomplete key-value pair of the new content distribution plan according to the selected candidate value.

At 830, the network management system transmits, new electronic communications to a plurality of networked devices. The network system may receive the modified new content distribution plan and generated based on the key-value pairs in the modified new content distribution plan a plurality of new electronic communications. For example, each of the new electronic communications generated from the modified new content distribution plan may contain one or more or all of the complete key-value pairs within the modified new content distribution plan. However, one or more aspects of each of the new electronic communications may be different. For example the "to" field within each of the new electronic communications may be different. In such an example, a similar electronic communication may be sent to multiple parties. The network management system may simultaneously transmit, via a network, the new electronic communications to a plurality of intended recipients. The intended recipients may be associated with one or more user devices communicatively coupled to the network management system. The network management system many monitor or receive recipient action indications from the one or more user devices and/or third-party application servers indicating recipient actions associated with the transmitted modified new electronic communication. The recipient action indications may be utilized by a machine learning model within the network management system to recognize how users of user devices respond to particular electronic communications and/or how security devices (i.e. firewalls, spam filters) respond to particular electronic communications. The machine learning model may be then utilized by the network management system to determine values that may be used in key-value pairs within new electronic communication in order to obtain a desired result (e.g., a certain percentage of intended recipients receive an electronic communication). The machine learning model may improve the throughput of electronic communications in a networked environment based on past electronic communications in the networked environment.

What is claimed is:
1. A computer-implemented method comprising:
  receiving a plurality of first content distribution plans, each first content distribution plan of the plurality of first content distribution plans comprising first values that correspond to a first plurality of first key-value pairs;

generating, for each first content distribution plan of the plurality of first content distribution plans, a first vector representation of each first value in the first plurality of first key-value pairs;

training, using the first vector representations, a machine learning model;

receiving, from a client device, a second content distribution plan that comprises second values that correspond to a second plurality of first key-value pairs and a second key-value pair, wherein the second key-value pair lacks at least part of a value;

generating a second vector representation of each second value in the second plurality of first key-value pairs;

executing the machine learning model to process one or more second vector representations, wherein a result of the execution includes an identification of a first group of content distribution plans, the first group of content distribution plans being a subset of the plurality of first content distribution plans;

identifying, for each content distribution plan in the first group of content distribution plans, a first key-value pair of the first plurality of first key-value pairs that corresponds to the second key-value pair of the second content distribution plan;

identifying, for each content distribution plan in the first group of content distribution plans, a characteristic that indicates a weight based, at least in part, on a likelihood of a downstream electronic event caused by an electronic communication according to the content distribution plan;

determining, based on the identified characteristics, display instructions, wherein the display instructions indicate a visual organization for at least one of the first key-value pairs of the first plurality of first key-value pairs that corresponds to the second key-value pair of the second content distribution plan; and generating, for the second content distribution plan that comprises the second key-value pair that lacks at least part of a value, a candidate group that identifies:
  for each content distribution plan in the first group of content distribution plans, a candidate value for the value of the content distribution plan that corresponds to the second key-value pair associated with the second content distribution plan, wherein at least one of the candidate values is stored in association with the second content distribution plan; and
  the display instructions.

2. The computer-implemented method of claim 1, wherein the characteristic indicates a quantity or percentage of electronic transmissions, distributed according to a content distribution plan, that were received at a corresponding destination device.

3. The computer-implemented method of claim 1, wherein the characteristic indicates a quantity or percentage of electronic transmissions, distributed according to a content distribution plan, for which a responsive communication was subsequently received, the responsive communication including a request for content identified in a distributed electronic communication.

4. The computer-implemented method of claim 1, wherein the display instructions indicate a ranked list of the candidate values of the content distribution plans of the first group of content distribution plans that correspond to the second key-value pair associated with the second content distribution plan.

5. The computer-implemented method of claim 1, wherein the display instructions identify an order or clustering for the candidate values of the content distribution plans of the first group of content distribution plans that correspond to the second key-value pair associated with the second content distribution plan.

6. The computer-implemented method of claim 1, further comprising:
  receiving, from the client device, a selection of a candidate value;
  modifying the second content distribution plan to include the selected candidate value; and
  transmitting an electronic communication to one or more user devices, the electronic communication being generated based at least in part on the modified second content distribution plan.

7. The computer-implemented method of claim 6, further comprising:
  receiving, from a user device of the one or more user devices, a response communication that indicates a content request for content represented in the electronic communication; and
  modifying, based on the response communication, a second characteristic associated with the second content distribution plan.

8. A non-transitory computer-readable storage medium having stored thereon instructions for causing at least one computer system to perform one or more functions, the instructions comprising:
  receiving a plurality of first content distribution plans, each first content distribution plan of the plurality of first content distribution plans comprising first values that correspond to a first plurality of first key-value pairs;
  generating, for each first content distribution plan of the plurality of first content distribution plans, a first vector representation of each first value in the first plurality of first key-value pairs;
  training, using the first vector representations, a machine learning model;
  receiving, from a client device, a second content distribution plan that comprises second values that correspond to a second plurality of first key-value pairs and a second key-value pair, wherein the second key-value pair lacks at least part of a value;
  generating a second vector representation of each second value in the second plurality of first key-value pairs;
  executing the machine learning model to process one or more second vector representations, wherein a result of the execution includes an identification of a first group of content distribution plans, the first group of content distribution plans being a subset of the plurality of first content distribution plans;
  identifying, for each content distribution plan in the first group of content distribution plans, a first key-value pair of the first plurality of first key-value pairs that corresponds to the second key-value pair of the second content distribution plan;
  identifying, for each content distribution plan in the first group of content distribution plans, a characteristic that indicates a weight based, at least in part, on a likelihood of a downstream electronic event caused by an electronic communication according to the content distribution plan;

determining, based on the identified characteristics, display instructions, wherein the display instructions indicate a visual organization for at least one of the first key-value pairs of the first plurality of first key-value pairs that corresponds to the second key-value pair of the second content distribution plan; and generating, for the second content distribution plan that comprises the second key-value pair that lacks at least part of a value, a candidate group that identifies:

for each content distribution plan in the first group of content distribution plans, a candidate value for the value of the content distribution plan that corresponds to the second key-value pair associated with the second content distribution plan, wherein at least one of the candidate values is stored in association with the second content distribution plan; and the display instructions.

9. The non-transitory computer-readable storage medium of claim 8, wherein the characteristic indicates a quantity or percentage of electronic transmissions, distributed according to a content distribution plan, that were received at a corresponding destination device.

10. The non-transitory computer-readable storage medium of claim 8, wherein the characteristic indicates a quantity or percentage of electronic transmissions, distributed according to a content distribution plan, for which a responsive communication was subsequently received, the responsive communication including a request for content identified in a distributed electronic communication.

11. The non-transitory computer-readable storage medium of claim 8, wherein the display instructions indicate a ranked list of the candidate values of the content distribution plans of the first group of content distribution plans that correspond to the second key-value pair associated with the second content distribution plan.

12. The non-transitory computer-readable storage medium of claim 8, wherein the display instructions identify an order or clustering for the candidate values of the content distribution plans of the first group of content distribution plans that correspond to the second key-value pair associated with the second content distribution plan.

13. The non-transitory computer-readable storage medium of claim 8, the instructions further comprising:
receiving a selection of a candidate value;
modifying the second content distribution plan to include the selected candidate value; and
transmitting an electronic communication to one or more user devices, the electronic communication being generated based at least in part on the modified second content distribution plan.

14. The non-transitory computer-readable storage medium of claim 13, the instructions further comprising:
receiving a response communication that indicates a content request for content represented in the electronic communication; and
modifying, based on the response communication, a second characteristic associated with the second content distribution plan.

15. A system, comprising:
one or more processors; and
a memory coupled with the one or more processors, the memory configured to store instructions that when executed by the one or more processors cause the one or more processors to:
receive a plurality of first content distribution plans, each first content distribution plan of the plurality of first content distribution plans comprising first values that correspond to a first plurality of first key-value pairs;

generate, for each first content distribution plan of the plurality of first content distribution plans, a first vector representation of each first value in the first plurality of first key-value pairs;

train, using the first vector representations, a machine learning model;

receive, from a client device, a second content distribution plan that comprises second values that correspond to a second plurality of first key-value pairs and a second key-value pair, wherein the second key-value pair lacks at least part of a value;

generate a second vector representation of each second value in the second plurality of first key-value pairs;

execute the machine learning model to process one or more second vector representations, wherein a result of the execution includes an identification of a first group of content distribution plans, the first group of content distribution plans being a subset of the plurality of first content distribution plans;

identify, for each content distribution plan in the first group of content distribution plans, a first key-value pair of the first plurality of first key-value pairs that corresponds to the second key-value pair of the second content distribution plan;

identify, for each content distribution plan in the first group of content distribution plans, a characteristic that indicates a weight based, at least in part, on a likelihood of a downstream electronic event caused by an electronic communication according to the content distribution plan;

determine, based on the identified characteristics, display instructions, wherein the display instructions indicate a visual organization for at least one of the first key-value pairs of the first plurality of first key-value pairs that corresponds to the second key-value pair of the second content distribution plan; and generate, for the second content distribution plan that comprises the second key-value pair that lacks at least part of a value, a candidate group that identifies:

for each content distribution plan in the first group of content distribution plans, a candidate value for the value of the content distribution plan that corresponds to the second key-value pair associated with the second content distribution plan, wherein at least one of the candidate values is stored in association with the second content distribution plan; and the display instructions.

16. The system of claim 15, wherein the characteristic indicates a quantity or percentage of electronic transmissions, distributed according to a content distribution plan, that were received at a corresponding destination device.

17. The system of claim 15, wherein the characteristic indicates a quantity or percentage of electronic transmissions, distributed according to a content distribution plan, for which a responsive communication was subsequently received, the responsive communication including a request for content identified in a distributed electronic communication.

18. The system of claim 15, wherein the display instructions indicate a ranked list of the candidate values of the content distribution plans of the first group of content distribution plans that correspond to the second key-value pair associated with the second content distribution plan.

19. The system of claim 15, wherein the display instructions identify an order or clustering for the candidate values of the content distribution plans of the first group of content distribution plans that correspond to the second key-value pair associated with the second content distribution plan.

20. The system of claim 15, wherein the instructions that when executed by the one or more processors further cause the one or more processors to:
   receive a selection of a candidate value;
   modify the second content distribution plan to include the selected candidate value; and
   transmit an electronic communication to one or more user devices, the electronic communication being generated based at least in part on the modified second content distribution plan.

\* \* \* \* \*